G. A. WINEMAN.
CASH REGISTER.
APPLICATION FILED NOV. 9, 1910.

1,033,973.

Patented July 30, 1912.
8 SHEETS—SHEET 1.

Witnesses
O. M. Shannon.
O. M. Dorr.

Inventor
GUSTAVE A. WINEMAN

By
Attorneys

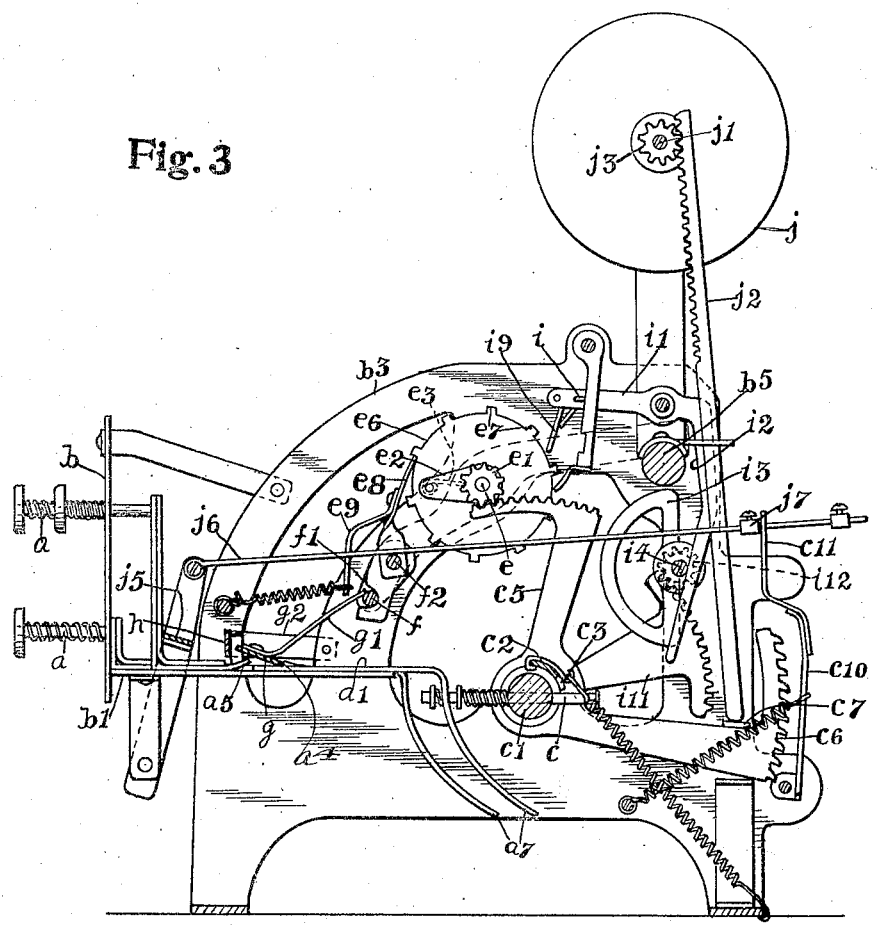

G. A. WINEMAN.
CASH REGISTER.
APPLICATION FILED NOV. 9, 1910.
1,033,973.
Patented July 30, 1912.
8 SHEETS—SHEET 4.
Fig. 8
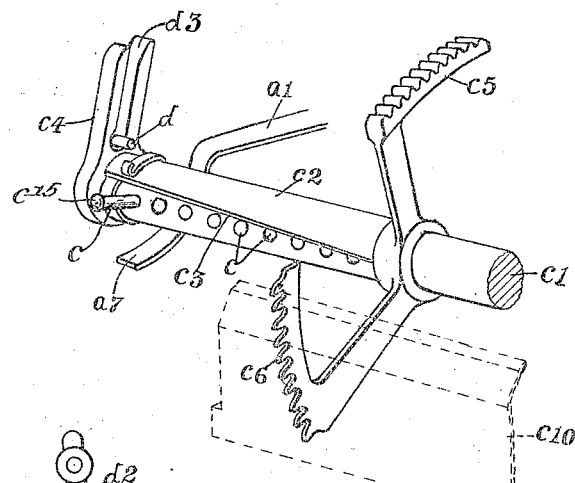
Fig. 4
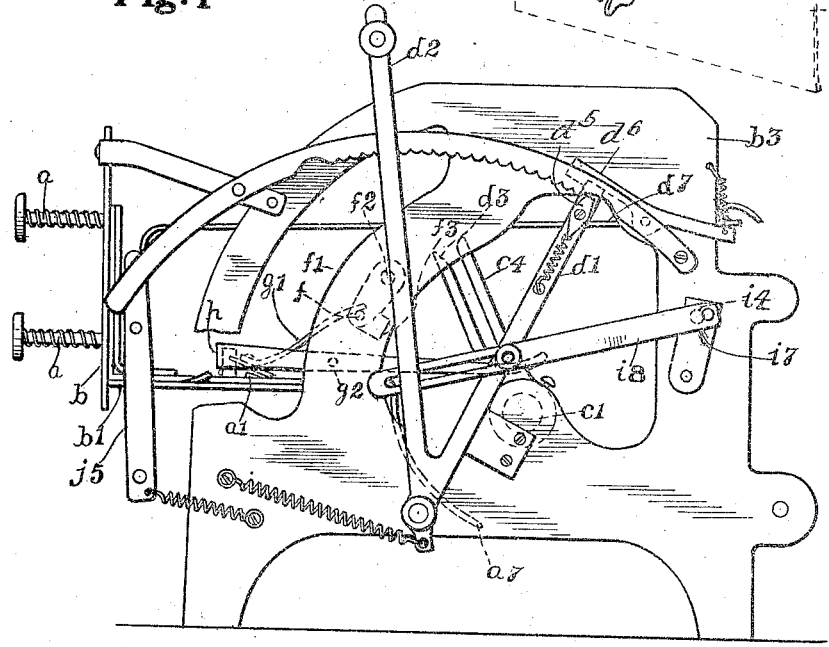
Witnesses
A. M. Shannon.
A. M. Dorr.
Inventor
GUSTAVE A. WINEMAN
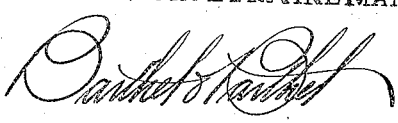
By
Attorneys

G. A. WINEMAN.
CASH REGISTER.
APPLICATION FILED NOV. 9, 1910.

1,033,973.

Patented July 30, 1912.
8 SHEETS—SHEET 5.

Witnesses
A. M. Shannon
Anna C. Rawler

Inventor
GUSTAVE A. WINEMAN
By Barthel & Barthel
Attorneys

G. A. WINEMAN.
CASH REGISTER.
APPLICATION FILED NOV. 9, 1910.
1,033,973.
Patented July 30, 1912.
8 SHEETS—SHEET 6.
Fig. 9
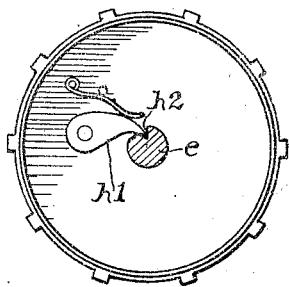
Fig. 5
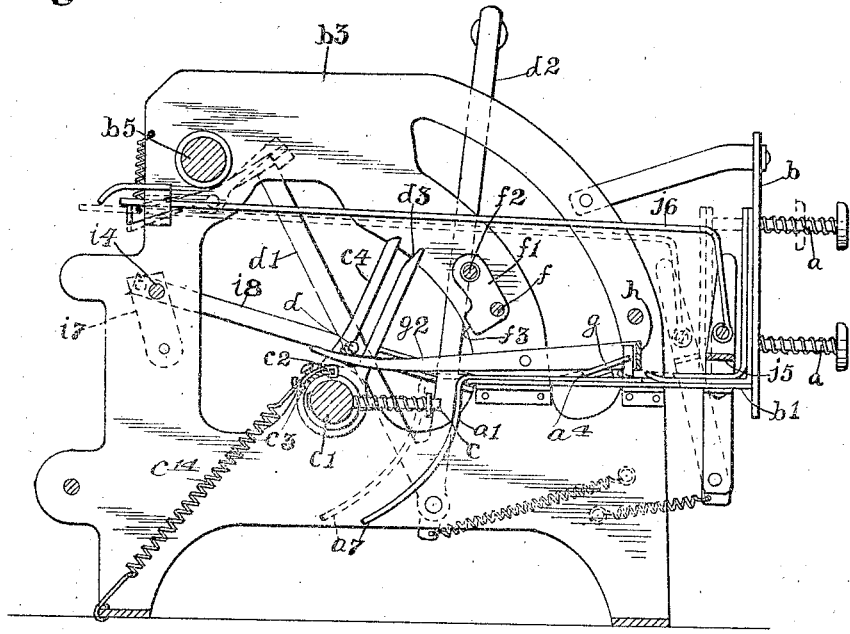
Inventor
GUSTAVE A. WINEMAN
Attorneys

G. A. WINEMAN.
CASH REGISTER.
APPLICATION FILED NOV. 9, 1910.

1,033,973.

Patented July 30, 1912.
8 SHEETS—SHEET 8.

Witnesses
A. M. Shannon.
A. M. Dorr.

Inventor
GUSTAVE A. WINEMAN.
By
Attorneys

UNITED STATES PATENT OFFICE.

GUSTAVE A. WINEMAN, OF DETROIT, MICHIGAN.

CASH-REGISTER.

1,033,973.  Specification of Letters Patent.  Patented July 30, 1912.

Application filed November 9, 1910. Serial No. 591,465.

*To all whom it may concern:*

Be it known that I, GUSTAVE A. WINEMAN, a citizen of the United States of America, residing at Detroit, in the county of Wayne and State of Michigan, have invented certain new and useful Improvements in Cash-Registers, of which the following is a specification, reference being had therein to the accompanying drawings.

This invention relates to cash registers and more especially to an arrangement of the mechanism whereby through the operation of a single operating lever the cash items are indicated singly and the total amount of a series of sales registered, and whereby the operator cannot inadvertently throw the machine out of order by improper manipulation and cannot tamper with the mechanism to falsify the registration.

The invention consists in the matters hereinafter set forth, and more particularly pointed out in the appended claims.

In general terms, a register that embodies features of this invention has a value or cash item indicating mechanism, a total adding mechanism, means for transferring the amounts indicated by the cash indicating mechanism to the totaling mechanism, means for operating these first two groups through the single movement of a lever, and interlocking means between the several groups and the components thereof which prevent improper operation of one of them to the injury of the others and which insure proper correlation of action between them.

Figure 1:
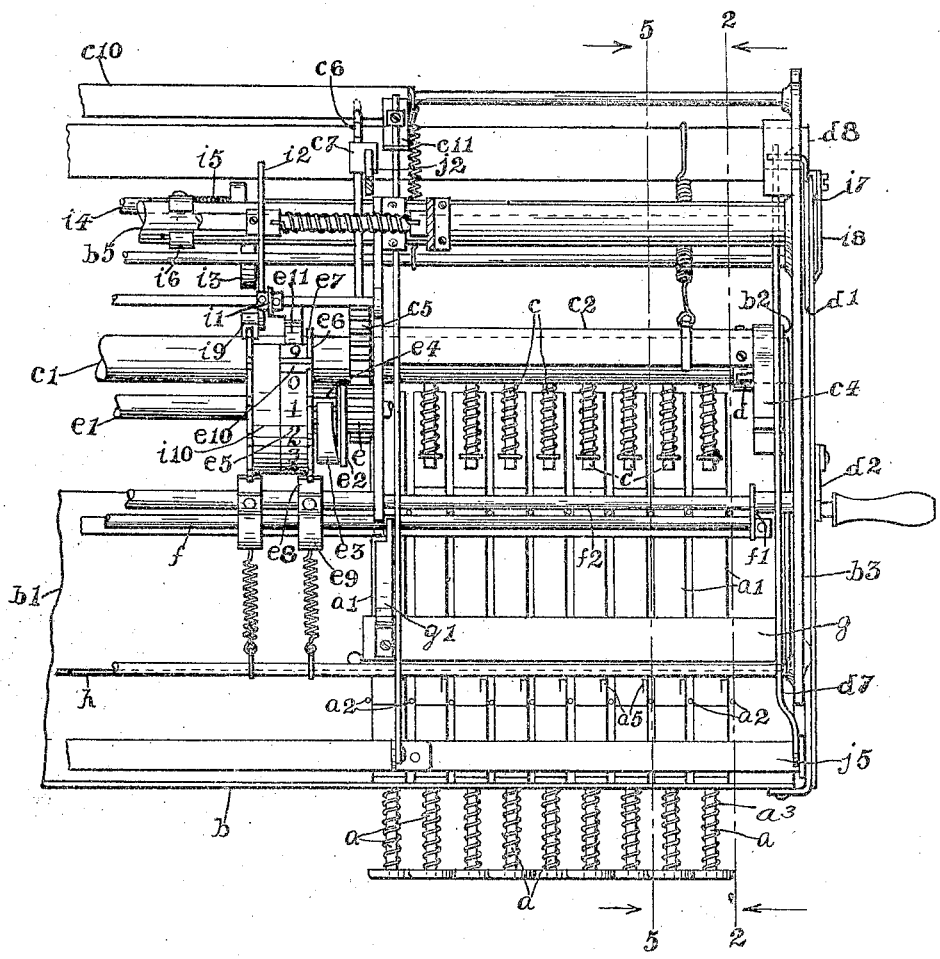
Figure 2:
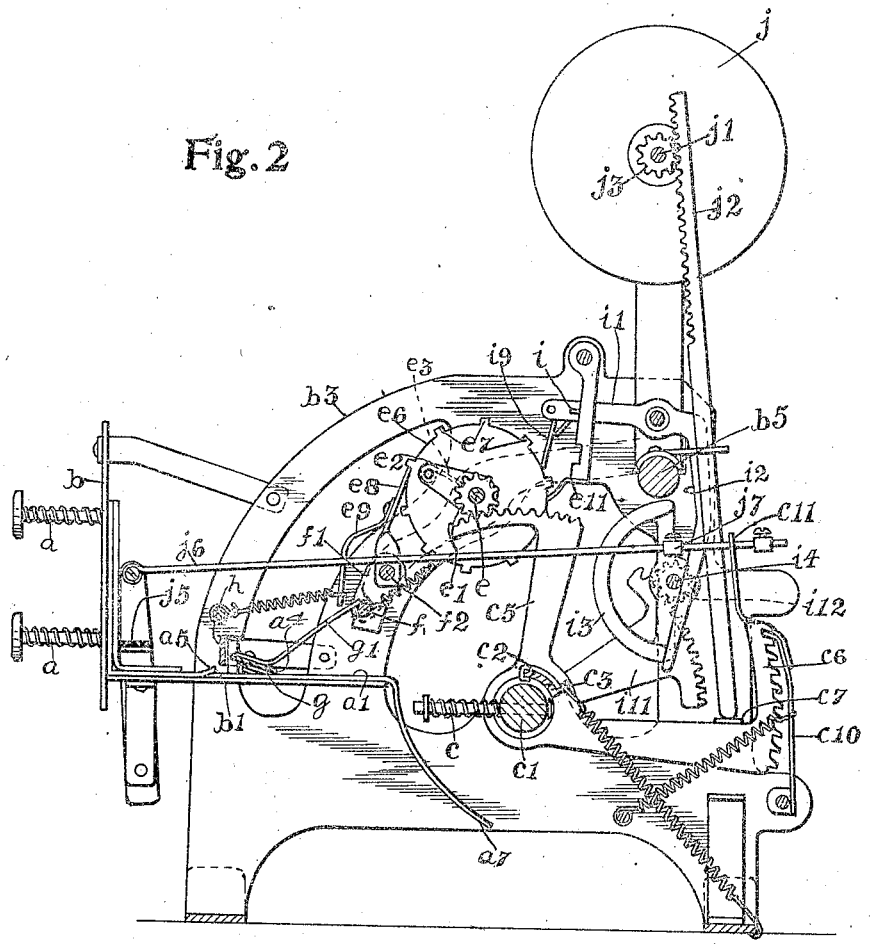
Figure 4A:
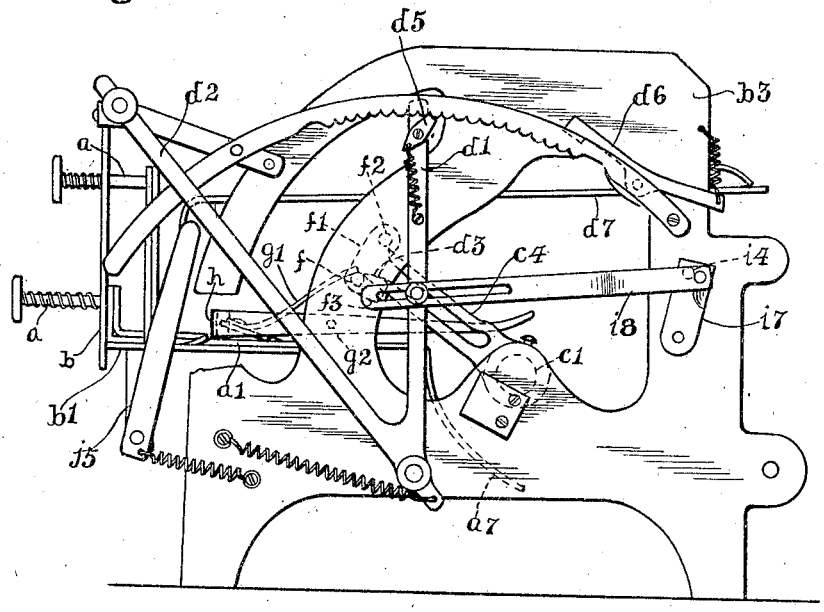
Figure 4B:
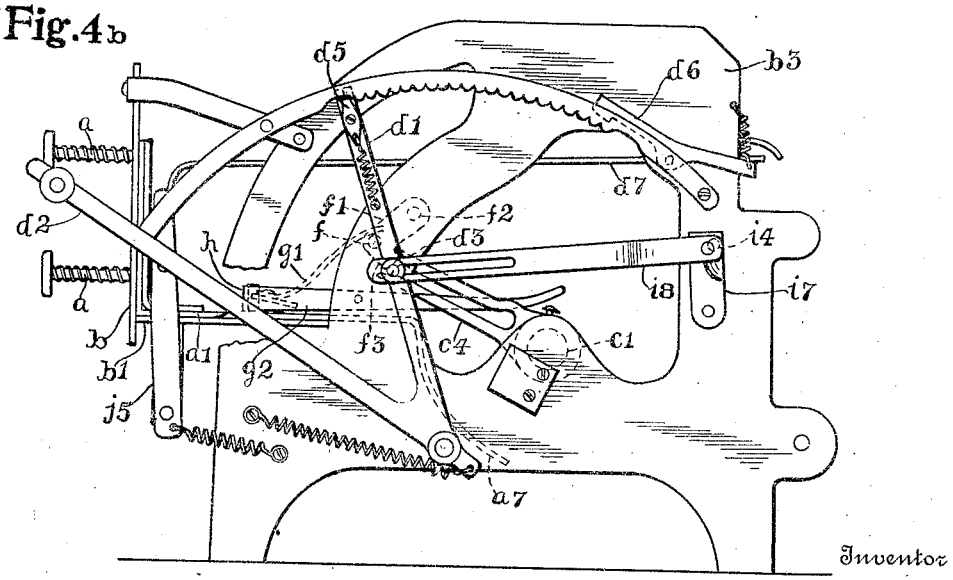
Figure 6:
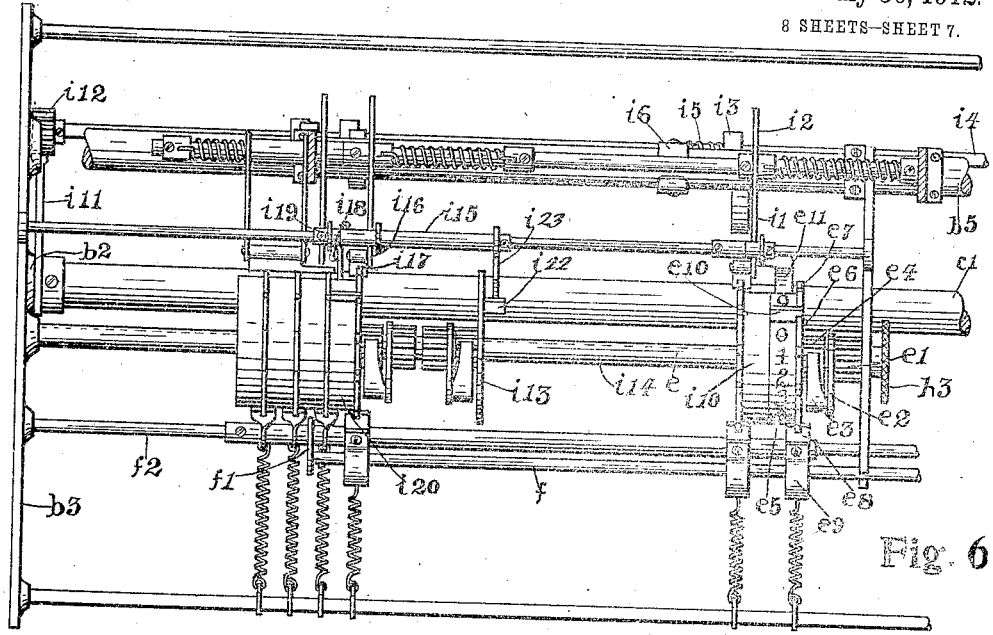
Figure 7:
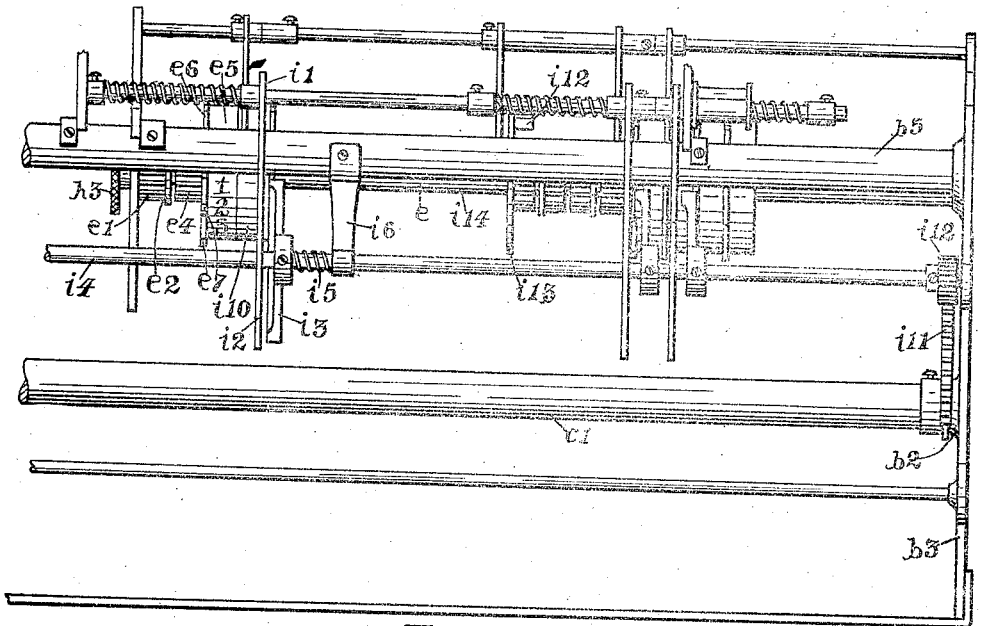
Figure 10:
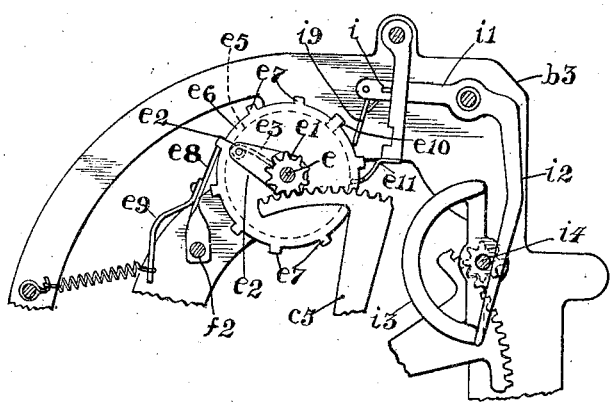
Figure 11:
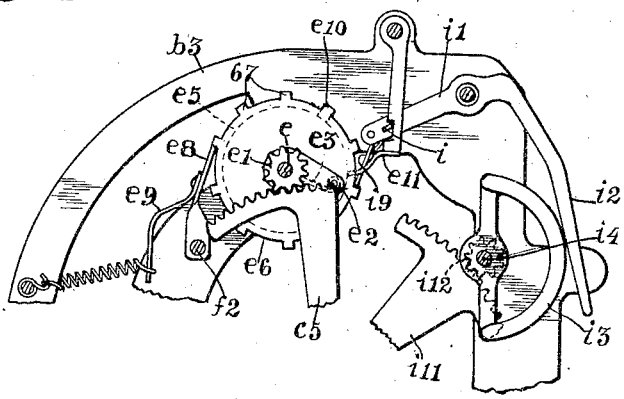

In the drawings, Figure 1 is a plan view of the cash item mechanism, partly broken away, together with an operating lever and its connections, shown in initial position or with the cash item keys in release position; Fig. 2 is a view in section looking in the direction of the arrows taken on line 2—2 of Fig. 1; Fig. 3 is a view on the same section line showing the position assumed by the parts with a cash item key in operative position; Fig. 4 is a view in end elevation of the mechanism shown in plan in Fig. 1; Fig. 4$^a$ is a view in end elevation of the mechanism in Fig. 4 in partially retracted position; Fig. 4$^b$ is a similar view showing the parts fully retracted; Fig. 5 is a view in section on the line 5—5 of Fig. 1 looking in the direction of the arrows; Fig. 6 is a plan view that is substantially a continuation of Fig. 1 and indicates a total adding mechanism; Fig. 7 is a view in rear elevation of the parts shown in Fig. 3; Fig. 8 is a view in detail of a transfer barrel; Fig. 9 is a view in detail of a registering wheel and drum; Fig. 10 is a view in detail of a transferring mechanism in initial position; Fig. 11 is a view of the same in thrown position; and Fig. 12 is a view in detail of a cam shaft.

As herein indicated shanks $a$ of cash item keys are reciprocable through guide apertures in the front plate $b$ of a main frame and are connected at their inner ends to slide bars $a^1$ moving longitudinally between guide pins $a^2$ on a flat plate $b^1$ of the frame. The inner ends of the slide bars are downturned or otherwise arranged to abut spring projected plungers $c$ extending through diametrical guide openings in a shaft $c^1$ journaled in suitable bearings $b^2$ on the end plates of the main frame. A transfer barrel $c^2$ partially encircles the shaft $c^1$ on which it is journaled at its ends and has its rear margins $c^3$ adjacent the rear ends of the plunger $c$ oblique to the axis of rotation of the shaft. A suitably disposed spring $c^{14}$ holds the barrel yieldingly in initial position. A forked or longitudinally slotted arm $c^4$ from one end of the shaft $c^1$ adjacent the end plate $b^3$ of the main frame is engaged by a pin $d$ on one arm $d^1$ of a main operating crank lever $d^2$ pivoted on the outer face of the end plate $b^3$.

A segmental quadrant with two sections is formed or secured on the end of the barrel remote from the arm $d^1$. One section $c^5$ has teeth corresponding in number to the number of cash item keys and these mesh with a gear $e^1$ rotatable on a shaft $e$ journaled longitudinally in the main frame. A ratchet arm $e^2$ carried by the gear $e^1$ has a pawl $e^3$ that engages a pinion $e^4$ having the same number of teeth as the gear $e^1$. A register wheel has a side periphery $e^5$ of sufficient width to display numerals thereon corresponding in number and value to those displayed on the cash item keys and is provided with a notched end plate $e^6$ adjacent and secured to the pinion $e^4$ with teeth $e^7$ corresponding in number to the teeth of the pinion and gear.

The barrel margin $c^3$ is so disposed in relation to the members $c$ that when one of the latter is projected through the shaft $c^1$ by pushing in the companion key, the edge of the barrel is intercepted by the projected plunger when the shaft $c^1$ is rocked forward by the forward movement of the main operating lever $d^2$ and thus turns the segment $c^5$ through an arc corresponding in number of teeth to the item value of the depressed key. This throws the gear $e^1$ and consequently the pinion $e^4$ and drum $e^5$ a corresponding number of teeth.

While the plungers $c$ have heads $c^{15}$ on their inner end which are adapted to hook over the edge $c^3$ of the barrel and retain the plungers until the barrel is swung back, further provision is made to prevent the plungers slipping back by providing each slide bar $a^1$ with a depending guard finger $a^7$ which has substantially the radius of curvature of the path described by the key end of a projected plunger, and thus prevents any longitudinal movement of the latter while being revolved by the barrel. Obviously, also the oblique margin of the barrel may be stepped instead of inclined.

To prevent overthrow of the drum $e^5$ a spring pressed arm $e^8$ bears against the notched periphery of the disk $e^6$. A depending finger $e^9$ of the arm $e^8$ is thrown out by a guard bar $f$ that is hung at its ends by straps $f^1$ pivoted at their upper ends on a cross pin $f^2$. The arm $f^1$ adjacent the end plate $b^2$ has a projecting lug $f^3$ (see Fig. 5) on its under margin which lies in the path of the stud $d$ on the lever arm $d^1$ and is engaged thereby to swing the guard bar out and consequently to depress the arm $e^8$ against the disk $e^6$, when the pin $d$ is nearing its outward limit of motion and has ceased to move the arm $c^4$ as it has reached a bevel $d^3$ on the end thereof which allows it to proceed without swinging the arm $c^4$ farther forward.

The key stems $a$ are returned to released position by suitably disposed springs $a^3$. When depressed, the slide bar $a^1$ of a key is momentarily held in projected position by an ear $a^4$ struck up from its upper surface that underruns the inner edge of a locking plate $g$ pivoted at its ends near its upper rear margin to lie across and on all the slide bars. If while the key is depressed and the main operating lever $d^2$ is still in initial position, a second key is depressed, a second projection $a^5$ on the slide bar passes and lifts the guard plate $g$ clear of the ear $a^4$ and releases the first key, which is at once snapped back by its spring $a^3$.

When the lever $d^2$ approaches the forward end of its throw, it swings the guard bar $f$ which underlies the finger $g^1$ extending from the plate $g$. The bar $f$ lifts the latter so that a previously depressed key is released and flies back. This takes place after the throw of the lever $d^2$ has actuated the segment $c^5$ and the gear $e^1$ so that the manipulation of the keys beyond this point does not effect the result of the registration.

To prevent movement of the keys before the lever has reached this point a lock bar $h$ is pivoted at its ends to swing in an arc over the slides and when depressed to lie in the path of the second projections $a^5$ on the slides $a^1$. A lever $g^2$ extending from the lock bar $h$ has an upturned inner end that is normally depressed by the pin $d$ when the main operating lever is in release or initial position and is cleared by the pin as the lever moves forward so that the lock bar drops into the path of motion of the projections $a^5$ and prevents the shifting of the keys.

The amounts recorded by the cash item mechanism just described are transferred to a total adding mechanism. When the throwing of the gear $e^1$ by successive movements of the keys has caused the pinion $e^4$ to complete a single revolution, a wide master tooth $e^2$ (as shown in Fig. 7) on the pinion throws the notched edge of a depending dog $e^{11}$ out of engagement with the projection $i$ of a transfer lever $i^1$. A rear depending arm $i^2$ of this lever when thus released, lies in the return path of a cam $i^3$ carried by a shaft $i^4$ rotatable and longitudinally reciprocable in bearings in the end plates of the main frame. A suitably disposed spring $i^5$ in compression between the cam and a bracket $i^6$ that extends from a stay rod $b^5$ of the frame, tends to project the shaft $i^4$ longitudinally against a keeper $i^7$ with a bevel face that is moved back and forth by a link $i^8$. The latter is longitudinally slotted and rides on the pin $d$ of the arm of the lever $d^2$ and is retracted when the lever reaches its forward limit of motion, so that the cam shaft $i^4$ is shifted longitudinally by the spring $i^5$. When the link returns, the shaft $i^4$ is returned to its initial position by the spring $i^5$. This movement of the shaft longitudinally moves the cam $i^3$ in and out of register with the arm $i^2$ so that when the latter is in released position the cam underruns it and depresses the lever $i^1$. A dog $i^9$ on the lever $i^1$ engages the toothed margin of a drum $i^{10}$ and advances the latter one tooth for each complete revolution of the drum $e^5$. The cam $i^3$ is rotated by means of a segmental gear $i^{11}$ on the main shaft $c^1$ which engages a pinion $i^{12}$ keyed or otherwise made fast to the cam shaft. The pinion has a face sufficiently wide to permit axial movement of the segmental gear without allowing the latter to disengage itself from the pinion.

A target drum $j$ is journaled to rotate on a suitable spindle $j^1$ in the frame before a view slot, not shown, in the casing and has characters on its periphery corresponding to the denominations on the keys. A second section $c^6$ on the quadrant of the barrel $c^2$ has a bearing ledge $c^7$ on which a rack rod $j^2$ rests. The latter, reciprocable in suitable guides in the frame, has teeth in mesh with a pinion $j^3$ on the hub of the frame and of the same number of teeth as the drum has characters on its periphery. If the movement of the lever $d^2$ throws the segment $c^6$ a certain number of teeth, this movement is repeated or translated to the drum so that the corresponding character appears before the view slot. To prevent the rack bar falling back, the segment $c^6$ is arrested by a stop plate $c^{10}$ whose inturned edge locks with the teeth of the segment to prevent retrograde movement and holds the latter in position at the upper limit of its throw. When a key is depressed it swings forward a release bar $j^5$ pivoted to swing in an arm across the slide bars. A link $j^6$ coupled to this bar passes through a guide aperture in an extension $c^{11}$ of the plate $c^{10}$ and an adjustable stop $j^7$ encounters the extension and thereby moves the plate out of engagement with the segment. This permits the drum $j$ and the barrel $c^2$ to return to initial position.

The items thus registered by the cash item mechanism just described are transferred to a total adding mechanism in the following manner: When the drum $i^{10}$ has completed one revolution a master tooth $i^{22}$ on a disk $i^{13}$ carried by the sleeve hub $i^{14}$ of the drum $i^{10}$, encounters an arm $i^{23}$ secured on a tubular rock shaft $i^{15}$. A second arm $i^{16}$ on the rock shaft moves a pawl $i^{17}$ out of engagement with a projection $i^{18}$ on a second transfer lever $i^{19}$ which is similar in all respects to the lever $i$ and operates through similar connections as herein indicated, a drum $i^{20}$ which constitutes the initial wheel of a total adding mechanism which is otherwise similar to the other registering wheel train with follower wheels $i^{21}$.

To lock the main operating lever from being thrown unless a key is depressed, the arm $d^1$, which has a spring controlled pawl $d^5$, Fig. 4, is engaged when in initial position, by a keeper lever $d^6$. When the movement of a key swings the release bar $j^5$, a rod $d^7$ coupled to the bar, with its outer end resting on an extension $d^8$ of the keeper lever $d^6$, is shifted so that said outer end is pressed down by an obliquely disposed finger $b^7$ on the adjacent end plate $b^3$ of the main frame. This swings the keeper lever $d^6$ out of engagement with the arm $d^1$, leaving the lever $d$ free to be swung.

Each of the several drums on the shaft $e$ is rotatable thereon, and has a spring pressed pawl $h^1$ which engages a slot $h^2$ in the shaft $e$. By turning the shaft $e$ backward by means of a suitable hand wheel $h^3$, the several wheels may be swung back until the master tooth on each is arrested by its operating pawl, thereby bringing the several wheels to the zero or starting point and resetting the mechanism after the totals have been taken off.

By this arrangement of mechanism a single forward movement of the operating lever, after the cash item keys are set as desired causes the machine to register the item and indicate it to the operator and to transfer the item to the total adding mechanism so that at any time the total items for any given length of time can be determined. At the same time it is impossible for the operator to improperly throw the mechanism to register other than the item shown by the indicating means. Furthermore the operating lever cannot be moved until the cash item keys are set, and when once set and its lever started on its arc of movement the cash item keys cannot be reset until the lever is returned to its initial position.

Obviously, changes in the details of construction may be made without departing from the spirit of the invention and I do not care to limit myself to any particular form or arrangement of parts.

I claim as my invention:—

1. In a machine for the purpose described, a main shaft, a barrel journaled on the shaft and provided with a stop margin oblique to the axis of the shaft, plungers shiftable through transverse apertures in the shaft into the path of motion of the stop margin, means for severally moving the plungers into the path of motion of the stop margins, and a gear operated by the barrel.

2. In a machine for the purposes specified, a cash item registering gear train, a master wheel for said train, a segmental gear in mesh with the master wheel of the train, a main shaft, a barrel carrying the segmental gear that is journaled on the shaft and is provided with a stop margin oblique to the axis of the shaft, a series of plungers longitudinally shiftable through transverse apertures in the shaft into the path of motion of the stop margin, means for severally moving the plungers into the path of motion of the stop margin, and means for turning the shaft.

3. In a machine for the purposes specified, a cash item registering gear train, a master wheel for said train, a segmental gear in mesh with the master wheel of the train, a main shaft, a barrel carrying the segmental gear that is journaled on the shaft and is provided with a stop margin oblique to the axis of the shaft, a series of plungers longitudinally shiftable through transverse apertures in the shaft into the path of motion of the stop margin, means for severally moving the plungers into the path of motion of the stop margin, a main operating lever movable through an arc of fixed range and an arm on the shaft operably connected to the lever.

4. In a machine for the purposes specified, a cash item registering gear train, a segmental gear in mesh with the master wheel of the train, a main shaft, a barrel carrying the gear and rotatable on the shaft that has a stop margin oblique to the shaft axis, plungers longitudinally movable through transverse guide apertures in the shaft into the path of motion of the stop margin, keys each adapted when depressed to move a plunger into the path of motion of the stop margin, and means for turning the shaft.

5. In a machine for the purposes specified, a cash item registering gear train, a segmental gear in mesh with the master wheel of the train, a main shaft, a barrel carrying the gear and rotatable on the shaft that has a stop margin oblique to the shaft axis, plungers longitudinally movable through transverse guide apertures in the shaft into the path of motion of the stop margin, keys each adapted when depressed to move a plunger into the path of motion of the stop margin, a lever for turning the shaft, means adapted to lock the lever when the keys are in inoperative position, and means for releasing the lever when the key is depressed.

6. In a machine for the purposes specified, a main shaft, a segmental barrel journaled thereon and provided with a stop margin oblique to the axis of the shaft, plungers longitudinally movable through transverse apertures in the shaft into the path of motion of the stop margin, and keys each longitudinally movable against a plunger with which the key is in substantial alinement.

7. In a machine for the purposes specified, a main shaft having a series of transverse guide apertures, a barrel journaled on the apertured portion of the shaft and provided with a longitudinal stop margin oblique to the shaft axis, gear teeth mounted on the barrel, a plunger longitudinally movable in each aperture, a spring on each plunger normally holding one end of the same out of the arc of motion of the stop margin of the barrel, a key for each plunger adapted to project it into the path of motion of the stop margin, and means for turning the shaft.

8. A machine for the purposes specified, a main shaft having a series of transverse guide apertures, a barrel journaled on the apertured portion of the shaft and provided with a longitudinal stop margin oblique to the shaft axis, gear teeth mounted on the barrel, a plunger longitudinally movable in each aperture, a spring on each plunger normally holding one end of the same out of the arc of motion of the stop margin of the barrel, a key for each plunger adapted to project it into the path of motion of the stop margin and adapted to maintain it in such position while the shaft is being turned, and means for turning the shaft.

9. In a machine for the purposes specified, a main shaft provided with transverse guide apertures lying in the same plane, a spring retracted plunger longitudinally movable in each guide aperture, a segmental barrel journaled on the apertured portion of the shaft and provided with a stop margin oblique to the axis of the shaft that is adapted to engage a projected plunger, a key for each plunger adapted when depressed to move the plunger into the path of motion of the stop margin, a guard finger on the key substantially concentric to the path of motion of the adjacent end of the companion plunger, and gear teeth on the barrel.

10. In a machine for the purposes specified, a main shaft provided with a series of transverse guide apertures lying in the same plane, plungers each longitudinally movable through a guide aperture and barrel journaled on the apertured portion of the shaft and provided with a stop margin oblique to the shaft axis, a gear segment mounted on the barrel, a cash item registering gear train whose master wheel is in mesh with said rack, a second gear segment mounted on the barrel, means for indicating the items registered on said train, a pinion for operating said indicating means in mesh with the second segment, means for selectively moving the plungers into the path of motion of the stop margin, and means for rotating the shaft.

11. In a machine for the purposes specified, a main shaft provided with a series of transverse apertures lying in the same plane, plungers each longitudinally reciprocable in a guide aperture, a barrel journaled on the apertured portion of the shaft and provided with a stop margin oblique to the shaft axis, means for selectively moving the plungers into the path of motion of the stop margin, means on the barrel for operating cash items registering mechanism, an indicating target wheel, and means operatively connecting the barrel and target wheel.

12. In a machine for the purposes specified, a main shaft provided with a series of transverse guide apertures lying in the same plane, plungers each longitudinally reciprocable in a guide aperture, a barrel journaled on the apertured portion of the shaft and provided with a stop margin oblique to the shaft axis, means for selectively moving the plungers into the path of motion of the stop margin, means on the barrel for operating cash item registering mechanism, an indicating target wheel, a pinion secured to the target hub, a rack bar meshing therewith, and an arm on the barrel adapted to reciprocate the rack bar.

13. In a machine for the purpose specified, a main shaft provided with a series of transverse guide apertures lying in the same plane, plungers each longitudinally reciprocable in a guide aperture, a barrel journaled on the apertured portion of the shaft and provided with a stop margin oblique to the shaft axis, means for selectively moving the plungers into the path of motion of the stop margin, means on the barrel for operating cash item registering mechanism, an indicating target wheel, a pinion secured to the target wheel hub, a rack bar meshing therewith, segmental gear teeth on the arm corresponding in number to the number of plungers in the shaft, a stop plate in spring pressed engagement with the teeth adapted to prevent retrograde movement, and means for releasing the stop plate from the teeth operated by the plunger operating means.

14. In a machine for the purposes specified, a main shaft a segmental gear thereon, a rotatable and longitudinally movable cam shaft parallel to the main shaft, a pinion on the cam shaft constantly in mesh with the segmental gear, a cam on the cam shaft, a transfer lever having an arm adjacent the cam when the cam shaft is in initial position, a keeper adapted to hold the shaft normally in initial position, a spring adapted to shift the shaft when disengaged from the keeper to move the cam into operative relation to the arm of the transfer lever, a main operating member for shifting the shaft, and connections between the main operating member or keeper adapted to momentarily release the cam shaft from the keeper with each movement of the main operating member.

15. In a machine for the purposes specified, a cash item registering train, a main shaft, a segmental gear in mesh with the initial wheel of the item train, a member for turning the main shaft, setting means forming operative connection between the gear and shaft to turn the gear any desired number of teeth, a second wheel in the train, a transfer lever adapted when oscillated to turn the second wheel one tooth, a latch normally retaining the lever in inoperative position, a master tooth on the initial wheel adapted to trip the keeper and release the lever, a rotatable and longitudinally movable cam shaft operated by the main shaft, a keeper adapted to hold the cam shaft in initial position, operative connections between the keeper and the main shaft adapted to release the cam shaft when the main shaft is turned, a cam on the cam shaft, and a spring adapted to project the cam shaft when the keeper releases it and to shift the cam into operative relation to the transfer lever.

16. In a machine for the purposes specified, a main shaft, cash item keys, an oscillatory member journaled on the shaft, means operated by the keys and adapted to severally lock the oscillatory member to turn with the shaft through an arc whose length corresponds to the denomination of a depressed key, a gear shaft, a gear journaled thereon, a drum adjacent the gear, a ratchet connection between the gear and drum adapted to turn the drum with the gear when the latter is rotated in one direction, a segmental gear on the oscillatory member in mesh with the gear, a notched end plate on the drum, an arm yieldingly bearing against the notched periphery of the plate, a guard bar adapted to depress the arm against the plate and mounted in the paths of motion of the keys to be swung therewith, and a lever for swinging the main shaft.

17. In a machine for the purposes specified, a main shaft, a member oscillatory on the shaft, cash item keys, means operated by the keys and adapted to lock the member to move with the shaft through an arc corresponding to the denomination of a depressed key, a main operating lever oscillatory transversely to the shaft, a longitudinally slotted arm secured to the shaft, a pin on an arm of the main lever traveling in the slot of said shaft arm, a lock bar pivoted to swing across the keys and adapted to lock the latter, and an arm extending from the lock bar and engaging the main lever pin to move the lock bar out of engagement with the keys when the main lever reaches a predetermined position.

18. In a machine for the purposes specified, a main shaft having transverse guide apertures lying in the same plane, spring retracted plungers each reciprocable in a guide aperture, a segmental barrel journaled on the apertured portion of the main shaft and provided with a stop margin oblique to the shaft axis, cash item keys of different denominations having slides each in longitudinal alinement with a plunger when the main shaft is in initial position, an arm on each slide concentric with the path of motion of the companion plunger end when the shaft is rotated, an ear on each slide, a locking plate transverse to the slides adapted to engage the ear of a projected slide, a guard bar swinging transversely above the slides, a finger on the guard plate adapted when engaged by the bar to move the plate out of contact with the ear of a projected slide, a main operating lever adapted to turn the shaft and to swing the lock bar, and cash item mechanism operatively connected to the barrel.

19. In a machine for the purposes specified, cash item registering mechanism, cash item keys, a main shaft, mechanism operatively connecting the shaft to the cash item mechanism to selectively actuate the latter, an overthrow arm adapted to limit the movement of the registering mechanism, a guard bar adapted to move the arm into engagement with the mechanism, a slotted arm on the shaft, a main operating lever, a pin on the lever traveling in the slotted arm adapted to contact with and swing the bar when the lever reaches its limit of movement, the slotted arm having a beveled face near its outer end over which the pin travels without swinging the arm.

20. In a machine for the purposes specified having cash item keys, means for registering the item of a depressed key, and means for preventing overthrow of the registering mechanism, a main shaft, means operatively connecting the shaft to the registering mechanism, a slotted arm on the shaft, a main operating lever, a pin secured thereon engaging the slot of the shaft arm, a keeper segmentally locking the lever from movement, means operated by the keys and adapted to release the keeper when the key is depressed, a lock bar adapted to retain a key in depressed position, an arm on the lock bar engaged by the pin of the lever to hold the lock bar out of engagement with the depressed keys when the lever is in initial position, a guard bar adapted to operate the overthrow mechanism, and means on the guard bar for moving the latter into operative relation to the overthrow mechanism, actuated by the pin of the lever when the latter is near the limit of its throw.

In testimony whereof I affix my signature in presence of two witnesses.

GUSTAVE A. WINEMAN.

Witnesses:
OTTO F. BARTHEL
C. R. STICKNEY.